United States Patent
Kobayashi et al.

[11] Patent Number: 5,601,425
[45] Date of Patent: Feb. 11, 1997

[54] STAGED COMBUSTION FOR REDUCING NITROGEN OXIDES

[75] Inventors: William T. Kobayashi, San Paulo-SP, Brazil; Arthur W. Francis, Jr., Monroe; Hisashi Kobayashi, Putnam Valley, both of N.Y.

[73] Assignee: Praxair Technology, Inc., Danbury, Conn.

[21] Appl. No.: 259,110

[22] Filed: Jun. 13, 1994

[51] Int. Cl.⁶ .................................................. F23C 5/00
[52] U.S. Cl. .............................. 431/8; 431/10; 431/190
[58] Field of Search ................................ 431/8, 10, 190

[56] References Cited

U.S. PATENT DOCUMENTS

| | | | |
|---|---|---|---|
| 3,685,946 | 8/1972 | Adams | 431/8 |
| 4,199,024 | 4/1980 | Rose et al. | 166/59 |
| 4,541,796 | 9/1985 | Anderson | 431/187 |
| 4,642,047 | 2/1987 | Gitman | 432/13 |
| 4,693,680 | 9/1987 | Snyder et al. | 431/10 |
| 4,797,087 | 1/1989 | Gitman | 431/10 |
| 4,842,509 | 6/1989 | Hasenack | 431/8 |
| 4,863,371 | 9/1989 | Ho | 431/9 |
| 4,907,961 | 3/1990 | Anderson | 431/8 |
| 4,946,382 | 8/1990 | Kobayashi et al. | 431/8 |
| 4,969,814 | 11/1990 | Ho et al. | 431/8 |
| 4,988,285 | 1/1991 | Delano | 431/5 |
| 5,076,779 | 12/1991 | Kobayashi | 431/5 |
| 5,104,310 | 4/1992 | Saltin | 431/10 |
| 5,186,617 | 2/1993 | Ho | 431/9 |
| 5,203,859 | 4/1993 | Khinkis et al. | 432/30 |
| 5,242,296 | 9/1993 | Tuson et al. | 431/10 |
| 5,267,850 | 12/1993 | Kobayashi et al. | 431/8 |
| 5,308,239 | 5/1994 | Bazarian et al. | 431/10 |
| 5,413,477 | 5/1995 | Moreland | 431/190 |
| 5,439,373 | 8/1995 | Anderson et al. | 431/190 |

*Primary Examiner*—Carroll B. Dority
*Attorney, Agent, or Firm*—Leisa M. Smith; Chung K. Pak

[57] ABSTRACT

A combustion method is provided for carrying out combustion with reduced generation of nitrogen oxides. The combustion method involves partially combusting a fluid fuel stream with a low velocity oxidant and thereafter mixing and combusting the resulting product with a secondary oxidant stream diluted with ambient gas. The velocity of the secondary oxidant stream is either increased to reduce the nitrogen oxides emission level or adjusted to provide the desired secondary oxidant/low velocity oxidant ratio which is useful for further decreasing the formation of nitrogen oxides. Normally, increasing the ratio and/or velocity further decreases the nitrogen oxides emission level. When liquid fuel is employed, it is atomized with atomizing fluid in such a manner to produce a liquid fuel stream having a very narrow spray angle. The production of such a stream allows the burner to be operated without water cooling. Moreover, such a stream, when combined with the above combustion method, unexpectedly provides effective and efficient combustion with reduced generation of nitrogen oxides.

9 Claims, 6 Drawing Sheets

STAGED COMBUSTION FOR REDUCING NITROGEN OXIDES

FIELD OF THE INVENTION

The present invention relates generally to fluid fuel combustion and particularly to liquid fuel combustion useful for minimizing the formation of nitrogen oxides.

BACKGROUND OF THE INVENTION

Nitrogen oxides are generated in a significant amount in many combustion processes. Since nitrogen oxides are known pollutants, it is desirable to reduce their generation during the combustion. To reduce nitrogen oxides generation, an oxygen enriched air or technically pure oxygen has been used in lieu of air as the oxidant to reduce the amount of nitrogen introduced per an equivalent amount of oxygen into a combustion zone. However, the use of an oxygen enriched air or technically pure oxygen as the oxidant causes the combustion processes to be carried out at high temperature. High temperature combustion kinetically favors the formation of nitrogen oxides and adversely affects the structural life of burners, particularly non-water cooled burners.

U.S. Pat. Nos. 5,076,779 and 5,242,296 disclose combustion methods wherein the formation of nitrogen oxides is suppressed. The combustion methods include diluting an oxidant stream with furnace gases in an oxidant mixing zone to form a diluted stream and then combusting fuel in the presence of the diluted stream in a reaction zone to avoid the conditions which favor nitrogen oxide formation. The fuel may be initially subject to partial combustion in the presence of a substoichiometric amount of oxidant before it is completely combusted in the presence of the diluted stream. These methods are shown to significantly reduce generation of nitrogen oxides. However, it is desirable to further reduce the nitrogen oxides emission.

The need for effective combustion with reduced generation of nitrogen oxides is increased when liquid fuel is involved. Due to the complexities associated with liquid fuel atomization and combustion, the reduction of the nitrogen oxide emission level is difficult. If a non-water cooled burner is employed within a refractory port of the furnace wall, the ejected liquid fuel from the burner can contact the refractory port and cause soot deposition which eventually could foul the burner.

Accordingly, it is an object of the invention to effectively and efficiently combust fuel, particularly liquid fuel, with the further reduction of nitrogen oxide generation.

It is another object of the invention to combust liquid fuel with non-water cooled burners and lances without causing a significant amount of soot deposition.

It is yet another object of the invention to combust liquid fuel with reduction of the flame temperature.

SUMMARY OF THE INVENTION

The above and other objectives which will become apparent to one skilled in the art upon reading this disclosure are attained by the present invention, one aspect of which is:

A process for combusting fluid fuel with reduced nitrogen oxides generation, said process comprising:

(a) ejecting at least one fluid fuel stream into a combustion zone;

(b) shrouding at least a portion of a length of said at least one fluid fuel stream with a substoichiometric amount of at least one primary oxidant stream ejected at a velocity less than 200 feet per second and partially combusting said fluid fuel with at least a portion of said primary oxidant to form partially combusted products;

(c) ejecting at least one secondary oxidant stream angled away from said fluid fuel stream and primary oxidant stream or from a point spaced from where said fluid fuel and primary oxidant stream are ejected or from an opposite point from where said fluid fuel stream and primary oxidant stream are ejected, wherein said at least one secondary stream ejected is such that the volume ratio of said secondary oxidant to said primary oxidant is greater than 1.5:1 but less than 20:1;

(d) diluting said secondary oxidant stream with a large volume of ambient gas containing an oxygen concentration of about 0.5 to about 15 percent by volume to form a diluted stream; and (f) mixing said diluted stream to said partially combusted product and thereafter combusting said partially combusted product with the oxygen in said diluted stream.

Another aspect of the present invention is:

A process for combusting liquid fuel with reduced nitrogen oxides generation, the process comprising:

(a) providing in a combustion zone at least one liquid fuel stream in the form of a spreading spray having an outer periphery angle of less than 15°, measured from the axis of said at least one liquid fuel stream;

(b) ejecting a substoichiometric amount of a primary oxidant stream at a velocity of less than about 200 feet per second in the form of an annular stream to surround or envelop at least a portion of a length of said at least one liquid fuel stream;

(c) entraining at least a portion of said primary oxidant stream within said liquid fuel stream and partially combusting said liquid fuel with the entrained oxidant to form partially combusted products;

(d) ejecting at least one secondary oxidant stream to establish an ambient gas circulation pattern wherein a large volume of ambient gas is entrained within said at least one secondary oxidant stream to form a diluted stream having an oxygen concentration of about 1 to about 30 percent by volume before being mixed with said partially combusted products; and (e) mixing said diluted stream with said partially combusted products and thereafter combusting said partially combusted products with the oxidant in said diluted stream.

As used herein the term "ambient gas" means gases within a combustion zone, i.e., a furnace.

As used herein the term "partially combusted products" means products of complete and incomplete combustion, including but not limited to $CO_2$, $CO$, $H_2O$, $H_2$, hydrocarbon and unburned fuel.

DETAILED DESCRIPTION OF THE INVENTION

Figure 1:
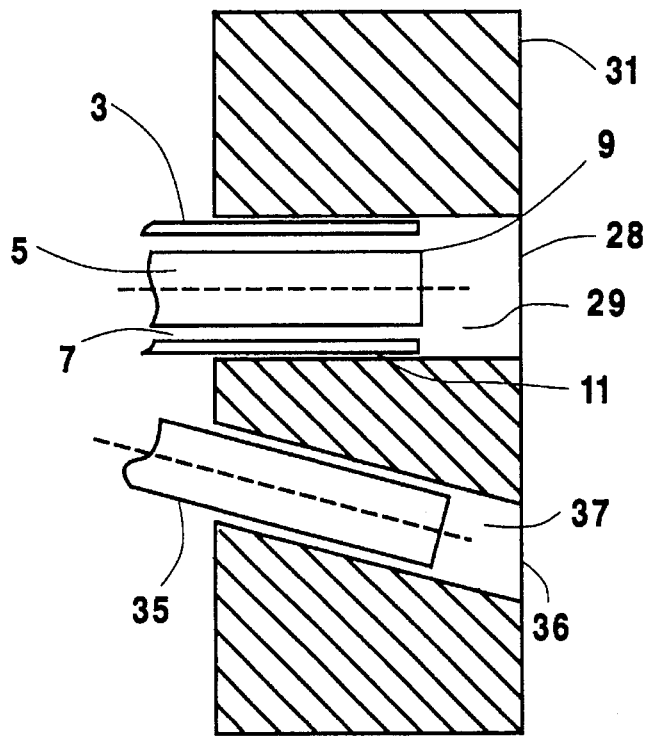
FIGS. 1 and 2 are cross-sectional views of various configurations relating to the introduction of primary oxidant, secondary oxidant and fuel, which are embodiments of the invention.
Figure 2:
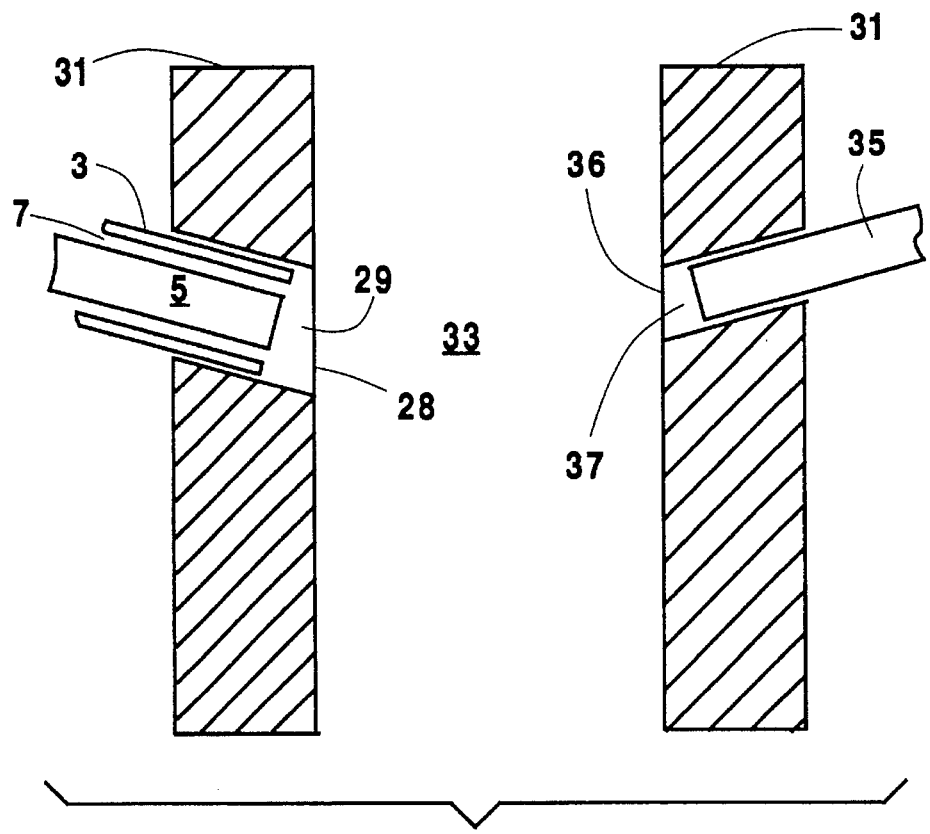

The invention will be described in detail in reference to the drawings.

Referring to FIGS. 1–4, fluid fuel and primary oxidant are ejected from one or more burners (3) having at least one fuel passageway (5) and at least one primary oxidant passageway (7). The burners (3) may comprise a nozzle (9) and an enclosure (11) concentrically surrounding at least a portion of the length of a nozzle (9). The annular passageway formed between the exterior surface of the nozzle (9) and the interior surface of the enclosure (11) represents the primary oxidant passageway (7) while the passageway of the nozzle (9) represents the fuel passageway (5).

In addition to the fuel passageway (5) and the primary oxidant passageway (7), at least one atomizing fluid passageway (13) is provided, when liquid fuel is employed. The desired atomizing fluid passageway (13) is appropriately designed and properly located to produce at least one liquid fuel stream in the form of a spreading spray having an outer periphery angle of less than 15°, preferably less than 10°, measured from the axis of said at least one liquid fuel stream. According to FIGS. 3–4, the atomizing fluid passageway (13) may be provided in the form of an intermediate annular passageway by concentrically surrounding at least a portion of the length of the nozzle (9) with an intermediate enclosure (15)(e.g., a fluid conduit placed between the nozzle and the enclosure (11)).

In one embodiment of the invention, the nozzle (9) useful for ejecting a liquid fuel spray having the desired narrow outer periphery angle has interior and exterior surfaces, with the interior surface defining the fuel passageway (5) which terminates with a fuel port (17). The fuel passageway (5) may comprise at least two lengths. The first length (5a) has a relatively large cross-sectional area or diameter while the second length (5b), which communicates with the first length (5a), has a cross-sectional area which decreases in the direction of the fuel port (17) (a radially decreasing taper), preferably in the form of a cone. The fuel port (17) has an inlet (19) for receiving fuel from the fuel passageway (5) and an outlet (21) for discharging fuel. The inlet (19) of the fuel port (17) is normally located at the end of the second length (5b) and has a cross-sectional area or diameter equal to or smaller than the cross-sectional area or diameter of the end opening of the second length (5b). The fuel port (17) may comprise at least three sections, with the first section (17a) having a diameter or a cross-sectional area equal to or smaller than the cross-sectional area or diameter at the end of the second length (5b) of the fuel passageway (5), the second section (17b) having a slightly decreasing cross-sectional area or diameter in the direction of the outlet (21) and the third section (17c) having a cross-sectional area or a diameter smaller than the cross-sectional area or diameter of the first section (17a). Generally, the fuel passageway (5) has a cross-sectional area or a diameter greater than the cross-sectional area or the diameter of the fuel port (17).

Figure 3:
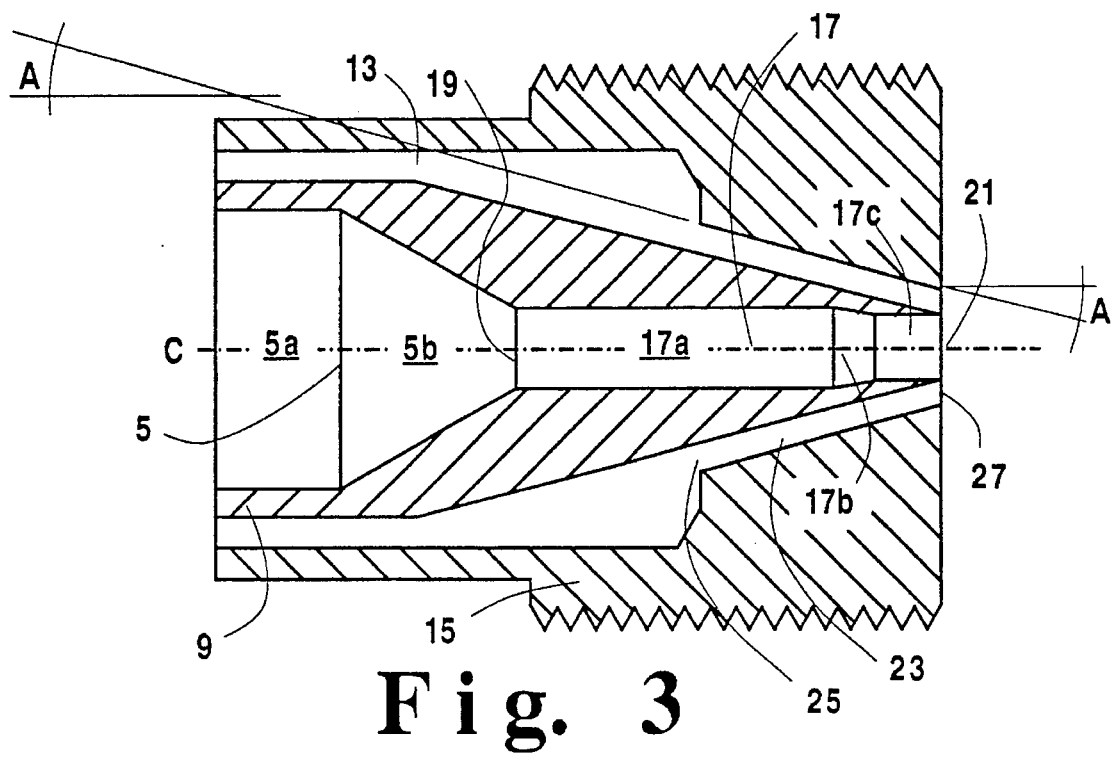
FIG. 3 is a cross-sectional view of an liquid fuel atomizing apparatus, which is another embodiment of the invention.

The intermediate enclosure (15) useful for forming the atomizing fluid passageway (13) capable of promoting the formation of a fuel spray having the desired outer periphery angle has interior and exterior surfaces and concentrically surrounds at least a portion of the nozzle (9). Between the interior surface of the enclosure (15) and the exterior surface of the nozzle (9), the atomizing fluid passageway (13), e.g., an annular passageway, and an atomizing fluid port (23), e.g., an annular atomizing fluid port. The annular atomizing fluid passageway (13) terminates with the annular atomizing fluid port (23) having inlet and outlet openings (25 and 27) for receiving and discharging atomizing fluid from the annular passageway (13). The annular atomizing fluid passageway (13) normally has a cross-sectional area or a diameter greater or larger than the cross-sectional area or the diameter of the annular atomizing fluid port (23). At least a portion of the interior surface of the intermediate enclosure (15) and at least a portion of the exterior surface of the nozzle (9) defining the annular atomizing fluid port (13) are in the form of a cone having a diameter decreasing toward the outlet opening at an angle (A) in the range of about 5° to about 30°, preferably about 12° to about 18°, measured from the longitudinal axis (C) of the nozzle (9). If these burners (3) are to be used as gas-cooled dual fuel burners, additional enclosures 42, 44, shown in phantom in FIG. 3, are needed to form additional passageways (e.g., additional annular passageways) for injecting different fuel, such as a fluid containing solid fuel particles or gaseous fuel, and additional primary oxidant.

The tip of at least one burners (3) may be recessed from at least one internal opening (28) of at least one refractory port (29) defined in at least one furnace wall (31) so that they may be used as non-water cooled burners. Each refractory port (29) has the internal opening (28) which faces a combustion zone (33) formed within the furnace wall (31). Generally, the diameter of the internal opening (28) is in the range of about 0.25 to about 10 inches. It was discovered that, by recessing the tip of each burner (3) from the internal opening (28) of the refractory port (29) by a distance of at least the diameter of the refractory port internal opening (28), each burner (3) can be employed without employing water cooling means. This recessed distance reduces the burner tip temperature. The burners (3) may be made with any materials which are compatible to combustion processes. Such materials include, among other things, stainless steel, metals, ceramics and plastics.

The fluid fuel employed may be liquid fuel, gaseous fuel, fluid containing solid fuel or mixtures thereof. The fuel, such as oils or coal, may contain chemically bound nitrogen. As used herein the term "chemically bound nitrogen" means nitrogen atom which is chemically attached to chemical compounds (excluding molecular nitrogen). Some of the chemical compounds having chemically bound nitrogen includes, among other things, amines, amides and heterocyclic compounds having nitrogen. If the liquid fuel employed has a high viscosity, it may be preheated before being delivered into the fuel passageway (5). The velocity of the fluid fuel is preferably greater than the velocity of the primary oxidant to promote stable partial combustion of the fluid fuel.

If the liquid fuel is employed, atomizing fluid is used to disperse the liquid fuel for efficient and effective combustion. The preferred atomization technique is such that the atomizing fluid causes the resulting atomized liquid fuel stream to have the desired narrow outer periphery spray angle consistently even when the liquid fuel is ejected at a low velocity, e.g. a velocity less than 50 feet per second. The preferred atomization technique involves ejecting the atomizing fluid at a velocity of about 0.5 to 1.2 Mach and converging the liquid fuel at a converging angle (A) in the range of about 5° to about 30°, preferably about 12° to about 18°, measured from the longitudinal axis (C) of the nozzle (9). The atomizing fluid ejected from the annular atomizing fluid port (23) subsequently entrains at least a portion of the primary oxidant within the liquid fuel stream, thus causing partial combustion of the liquid fuel. Other atomization techniques may be employed as long as the desired narrow outer periphery spray angle can be obtained and as long as at least a portion of the primary oxidant is entrained within the liquid fuel stream. The obtention of this desired narrow outer periphery spray angle, not only promotes the use of a non-water cooled oil-fuel burner, but also enhances the effective and efficient combustion of the liquid fuel with reduced generation of nitrogen oxides. Also, controlling or adjusting the rate of the atomizing fluid ejected to maintain the mass ratio of the atomizing fluid to the liquid fuel in the range of about 0.3 to about 0.7, preferably about 0.4 to 0.7 further promotes the reduction of the nitrogen oxides emission levels. The atomizing fluid employed can be any gaseous substance, including but not limited,to steam, carbon dioxides, argon, nitrogen, air, oxygen enriched air and pure oxygen. The atomizing gas which does not contain nitrogen is generally preferred.

The primary oxidant ejected from the primary oxidant passageway (7) shrouds and reacts with the fluid fuel. The primary oxidant ejected contains a substoichiometric amount of oxygen for reacting the fluid fuel, thus causing partial combustion of the fluid fuel. The desired substoichiometric amount of oxygen is about 10 to 30 percent of a stoichiometric amount of oxygen for reacting the fluid fuel stream. The velocity of the primary oxidant is normally maintained less than 200 feet per second, preferably less than 100 feet per second, to promote the stable partial combustion and reduce the formation of nitrogen oxides. The primary oxidant employed may be air, oxygen enriched air or technically pure oxygen. The desired primary oxidant, however, contains an oxygen concentration of greater than 30 percent by volume. It should be understood that additional primary oxidant and fuel (e.g., different fuel) may be introduced through additional passageways, e.g., outer annular passageways, within the burners (3). By using additional primary oxidant and fuel, the burners (3), for example, can be used as a dual fuel burner.

During the ejection of the fluid fuel and the primary oxidant from each burner (3), a secondary oxidant stream is ejected from at least one lance (35). The lance (35) is placed within at least one second refractory port (37) of the furnace wall (31). The refractory port (37) has an internal opening (36) which faces the combustion zone (33). The tip of the lance (35) may be recessed from the internal opening (36) of the refractory port (37) by a distance equal to at least the diameter of the internal opening (36) of the refractory port (37). If the tip of lance (35) is made with ceramic materials, it need not be recessed. This lance design or recess allows the lance (35) to be operated without water cooling, thus avoiding corrosion associated with water cooling.

The position of the lance (35) causes the secondary oxidant stream to be ejected from a point spaced from, angled away from, opposite to and/or adjacent to where the primary oxidant and fuel streams are being ejected. When the lance (35) is angled or spaced from the burner (3), the spacing distance and/or the ejection angle is such that the ejected secondary oxidant stream entrains a large volume of ambient gas, that is, the gas within the combustion zone or furnace, before the secondary stream reacts with the partially combusted products. For example, when the secondary oxidant stream is ejected parallel to the fuel stream, the point at which the secondary oxidant is ejected should be at least 3 inches spaced away from a point at which the fuel and primary oxidant streams are ejected. On the other hand, when the lance (35) is located at least one wall opposite and/or adjacent to where the burners (3) is located, a point at which the partially combusted products and the secondary oxidant are intersected should be sufficiently far from a point where the secondary oxidant is ejected to cause the formation of the desired diluted stream before the secondary oxidant stream is mixed with the partially combusted products. The desired diluted stream has an oxygen concentration of about 1 to about 30 percent by volume, preferably about 2 to about 25 percent by volume. The desired dilute stream is formed by establishing an ambient gas circulation pattern with the secondary oxidant stream whereby the secondary oxidant stream entrains the ambient gas before it is used for combusting the partially combusted products. The ambient gas normally contains an oxygen concentration of about 0.5 to about 15 percent. By forming the desired diluted stream, the flame temperature and the nitrogen oxide emission are reduced.

Figure 5:
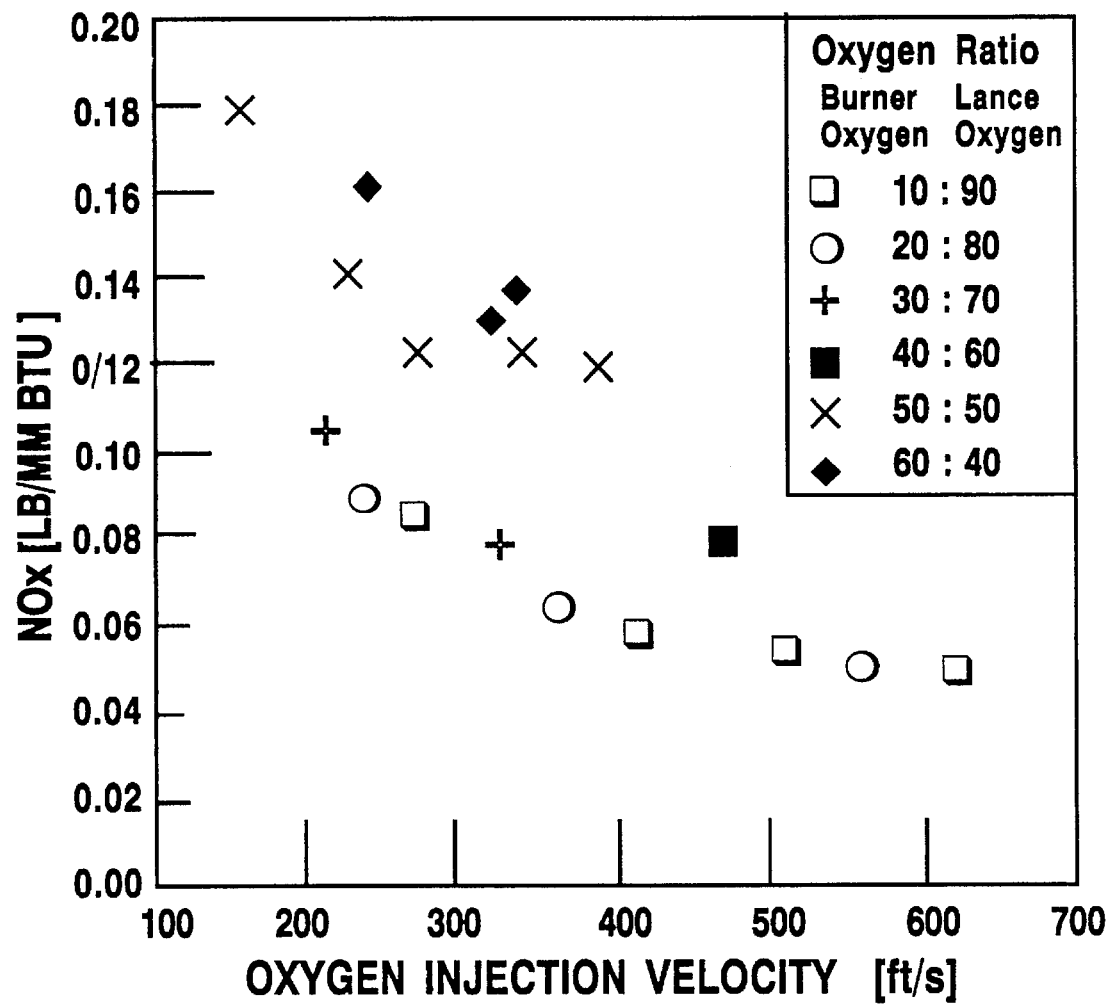
FIGS. 5–6 are graphical representations illustrating the importance of using particular volume ratios of secondary oxidant stream to primary oxidant, which is an additional embodiment of the invention.
Figure 6:
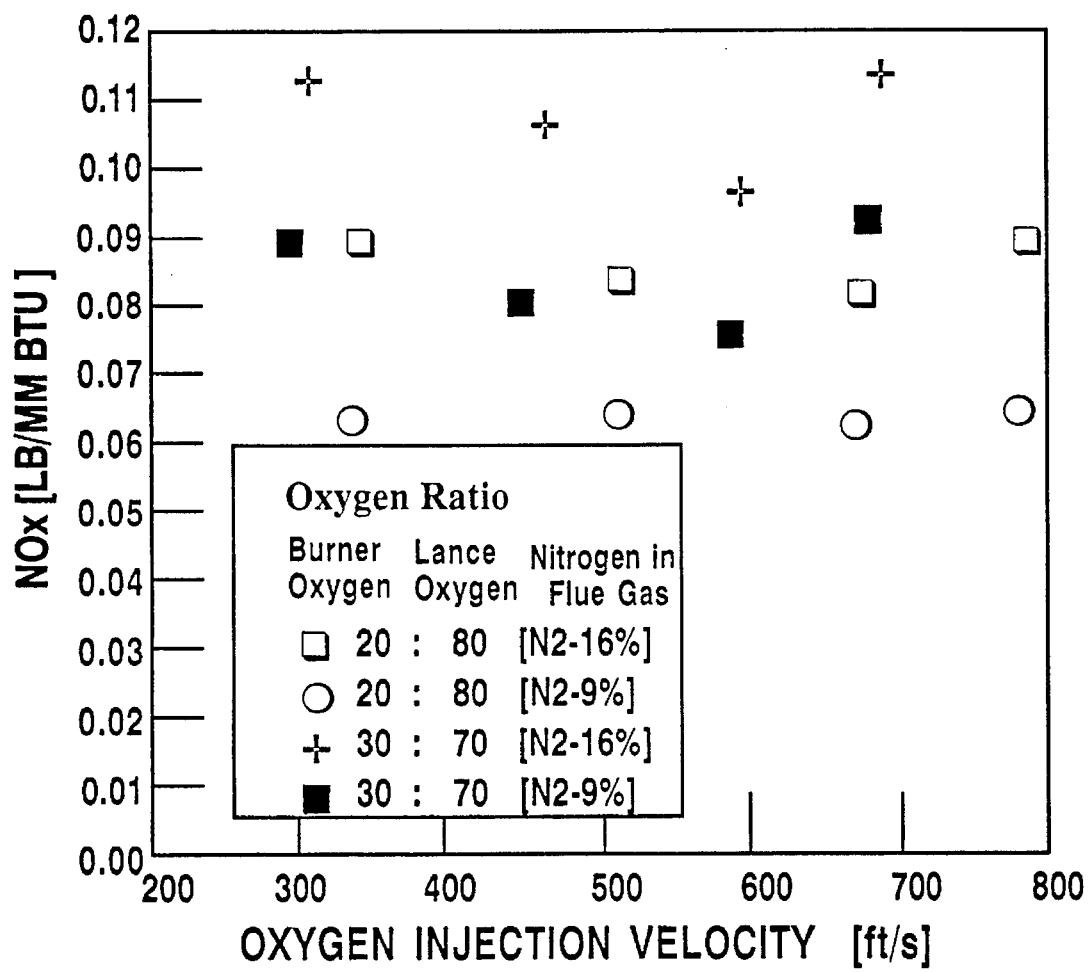

In addition to ejecting the secondary oxidant as indicated above, the amount of the secondary oxidant introduced is regulated or adjusted based on the amount of the primary oxidant introduced to further reduce the formation of nitrogen oxides. FIGS. 5–6, for instance, illustrates a plot of NOx (the nitrogen oxides emission level) versus the secondary oxidant injection velocity using different ratios of the secondary oxidant to primary oxidant. The plot suggests that the mass of nitrogen oxides generated is decreased with the increased volume ratio of the secondary oxidant to the primary oxidant. The desired volume ratio of the primary oxidant to the secondary is greater than 1.5:1, preferably greater than or equal to 2.4:1, more preferably greater than 3:1 but less than 20:1.

Figure 7:
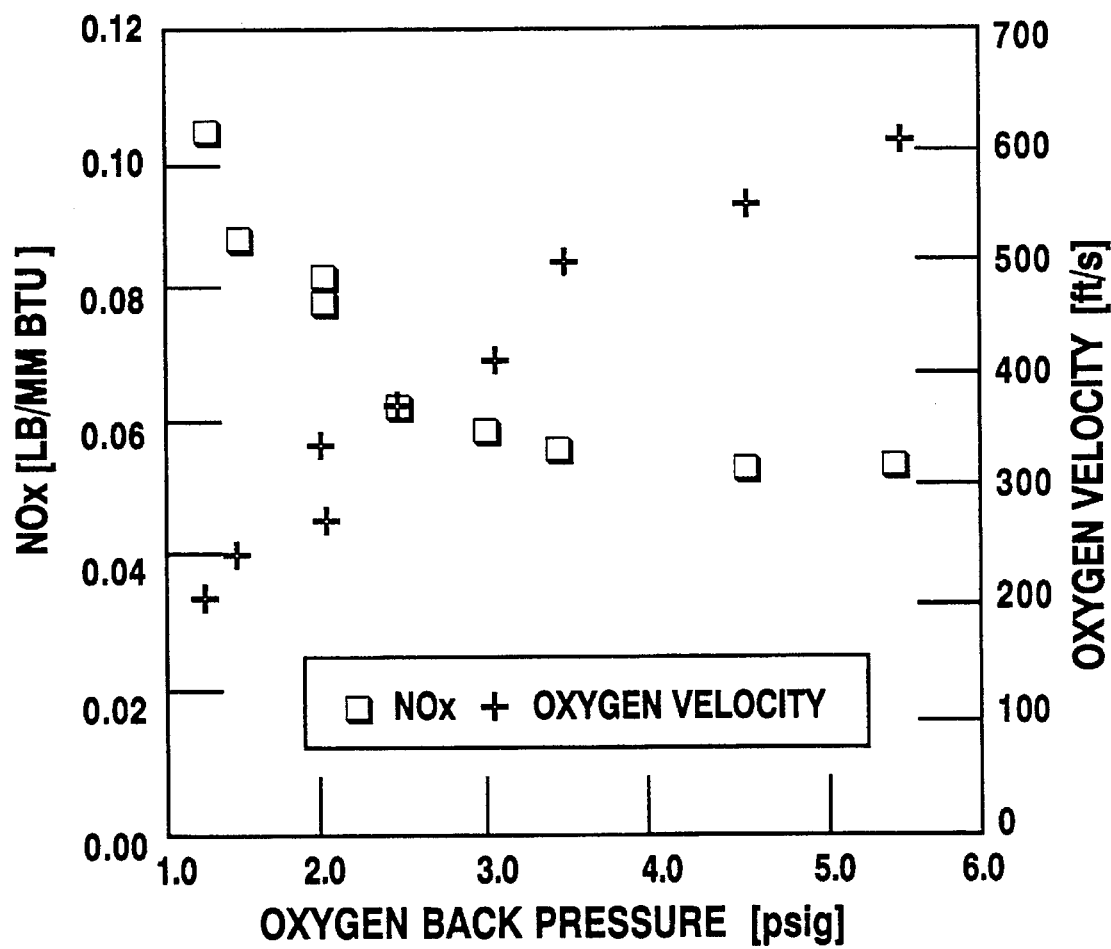
FIGS. 7–8 are graphical representations illustrating the importance of ejecting secondary oxidant at particular velocities, which is a further embodiment of the invention.
Figure 8:
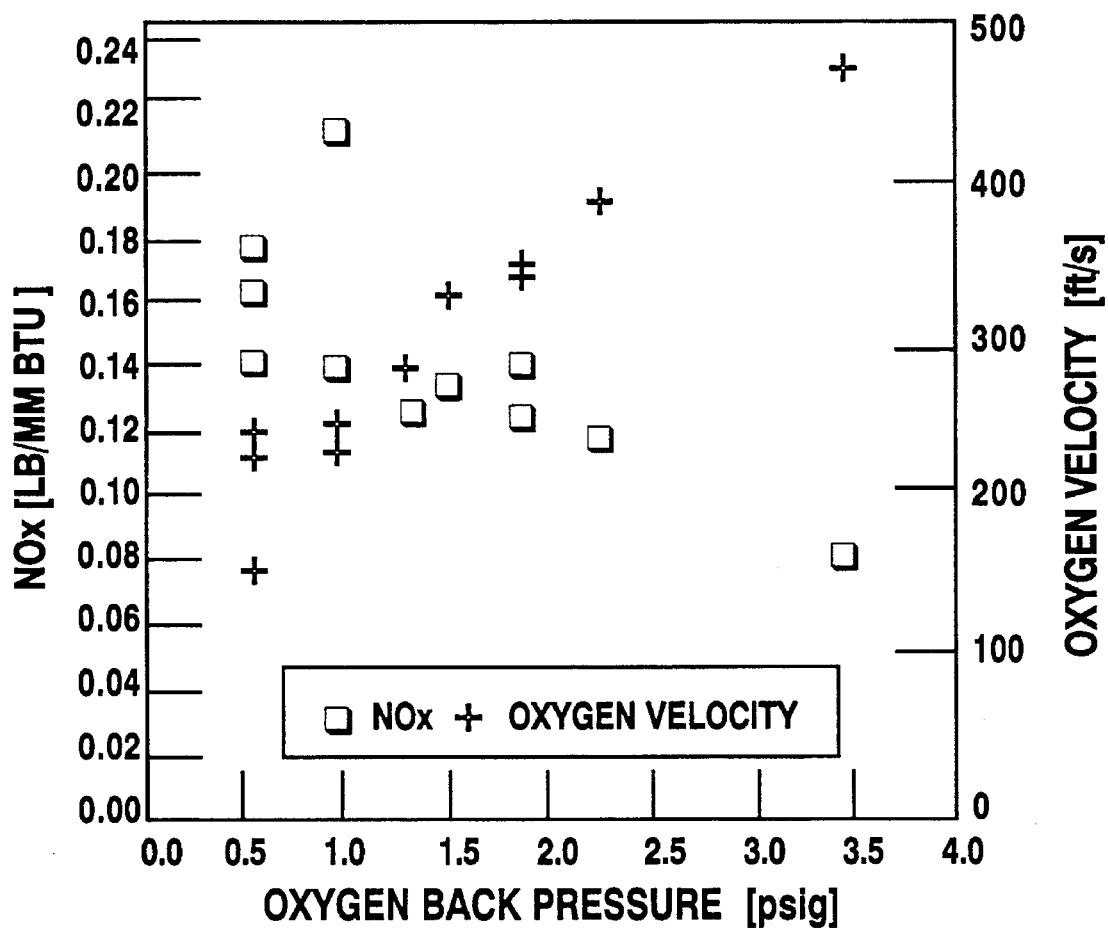

Moreover, the velocity of the secondary oxidant should be high to further reduce of the formation of nitrogen oxides. FIGS. 7–8 show a plot of NOx (the nitrogen oxides emission level) versus secondary oxidant back pressure and secondary oxidant injection velocity. The plot indicates that the mass of nitrogen oxides generated decreases with increasing the secondary oxidant injection velocity or the secondary oxidant back pressure. The desired velocity of the secondary oxidant is greater than 250 feet per second, preferably greater than 300 feet per second, more preferably greater than 400 feet per second. The secondary oxidant employed can be air, oxygen enriched air or technically pure oxygen. The desired secondary oxidant, however, contains an oxygen concentration of greater than 30 percent by volume.

In practice, the secondary oxidant ejected at a high velocity from the desired locations as indicated above establishes ambient gas circulation pattern whereby the ambient gas and partially combusted products resulting from combusting fuel with the primary oxidant are entrained into the secondary oxidant stream due to the jet aspiration effects of the secondary oxidant stream. Since the velocity of the secondary oxidant stream is high and is ejected from a point sufficiently away from the fuel and primary oxidant streams, mixing of the secondary oxidant with the fuel and primary oxidant is delayed. This delay allows the secondary oxidant to be mixed with the ambient gas initially to form the desired diluted stream while forming partially combusted products through partial combustion of the fuel with the primary oxidant. The resulting diluted stream then entrains and combusts the partially combusted products.

In order to further illustrate the invention, the following examples are provided. They are presented for illustrative purposes and are not intended to be limiting.

All the tests in these examples were conducted in a laboratory furnace whose internal dimensions are 3 ft in diameter and 8 ft long. The furnace had at least one wall defining at least two ports having end openings which open into the internal chamber of the furnace.

The physical and chemical properties of the fuel oil employed are shown in the Tables below.

TABLE 1

| C | H | S | N | H$_2$O |
|---|---|---|---|---|
| 85.12 | 10.99 | 0.27 | 0.22 | 2.6 |

TABLE 2

| viscosity | cSt | at 140° F. | 32.96 |
|---|---|---|---|
| | | at 180° F. | 16.21 |
| Density | | at 140° F. | 0.8980 |
| | | at 180° F. | 0.8855 |
| Heating | Btu/lb | Gross | 18503 |
| Values | | Net | 17799 |

The oil was pumped at 140° F. and the temperature at the burner inlet was kept at 180° F. in order to keep the oil viscosity at 16 cSt (centistokes). The burner was fired at a firing rate of 1 MM Btu/h. Nitrogen was injected through three points in the furnace side wall in order to simulate air infiltration since this problem occurs in industrial furnaces.

The furnace refractory wall average temperature was kept at 2800° F. during the NOx measurements. The NOx results are expressed based on NO measured by a chemiluminescent analyzer and expressed as lb (pound) of NO2 per million BTU of fuel fired.

Figure 4:
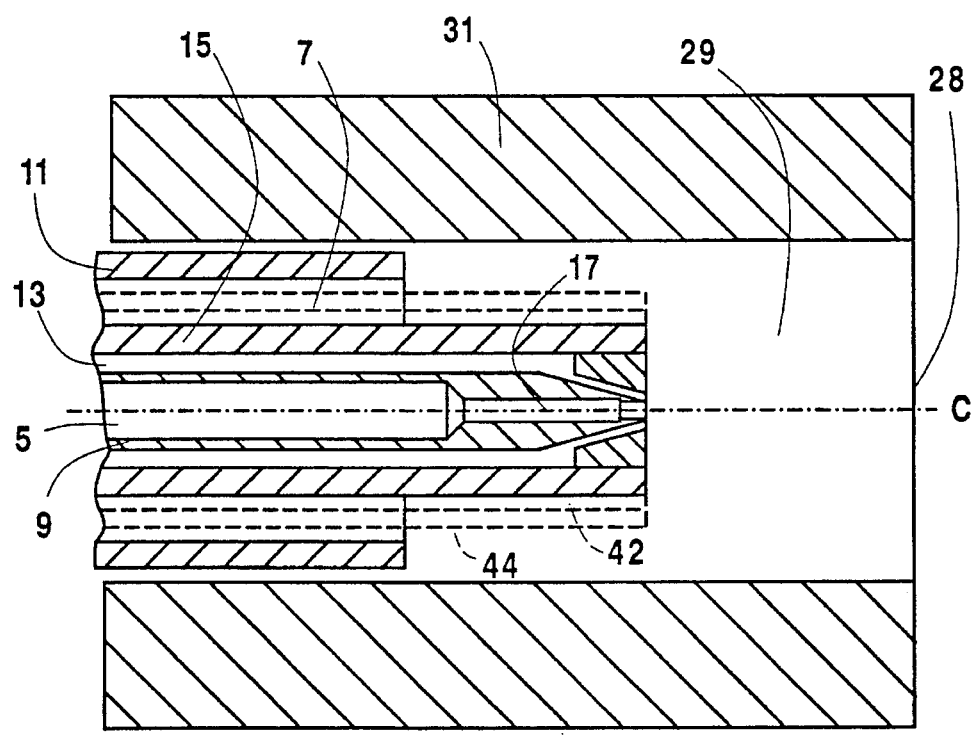
FIGS. 4 is a cross-sectional view of liquid fuel burners having the atomizer of FIG. 3, which is yet another embodiment of the invention.

The tests were carried out with the burner shown in FIG. 4. The burner was placed within refractory port defined in the furnace wall such that the tip of the burner was recessed from the internal opening of the port by about 4 inches (twice the diameter of the internal opening). An oxygen lance was placed within another refractory port defined in the furnace wall such that the tip of the lance is recessed from the internal opening of the port by about 2 inches (a distance equal to the diameter of the internal opening of another refractory port). Both the burner and the lance were installed parallel to each other and were about 6 inches apart from one another. While the lance was used to eject secondary oxidant, the burner was used to eject oil, atomizing fluid and primary oxidant to partially combust the oil. Steam, air and oxygen were employed as atomizing fluid. The amount of the atomizing fluid ejected was such that the atomizing fluid/oil mass ratio was maintained at about 50%. For FIG. 5, steam was employed as the atomizing fluid. For FIGS. 6, the atomizing fluid employed is air. To obtain plots for FIGS. 5–6, the secondary oxidant injection velocity and the secondary oxidant/primary oxidant volume ratio were varied. The plots show the effect of the secondary oxidant/primary oxidant volume ratio on the nitrogen oxides emission level. According to the plots in FIGS. 5–6, the nitrogen oxides emission level can be decreased by increasing the secondary oxidant/primary oxidant volume ratio. In FIGS. 7–8, the effect of the secondary oxidant injection velocity on the nitrogen oxides emission level is illustrated. The amount of the primary oxidant injected was such that oxygen introduced through the burner constitutes about 30% and 40% respectively for FIGS. 7 and 8 based on the total oxygen introduced. The atomizing fluid employed is steam for both FIGS. 7 and 8. According to the plots in FIGS. 7 and 8, increasing the velocity of the secondary oxidant decreases the nitrogen oxides emission level.

By employing the present invention, the nitrogen oxide emission level is significantly reduced. The reduction of the nitrogen oxide level in the context of liquid fuel combustion is especially noteworthy because the reduction of the nitrogen oxide emission level provided by the invention using a liquid fuel stream having a very narrow spray angle would not have been contemplated by those skilled in the art due to the complexities associated with liquid fuel atomization and combustion. Moreover, being able to use the liquid fuel stream having a very narrow spray angle with reduced nitrogen oxides generation allows the burner to be used without water cooling and without causing fouling and corrosion for a long period.

Although the present invention has been described in detail in reference to certain embodiments, those skilled in the art will recognize that there are other embodiments of the invention within the spirit and scope of the claims.

What is claimed is:

1. A process for combusting fluid fuel with reduced nitrogen oxides generation, said process comprising:

(a) injecting at least one fluid fuel stream into a combustion zone through a nozzle having an opening at a tip that is recessed from an internal opening of at least one refractory port defined by at least one wall surrounding said combustion zone;

(b) shrouding at least a portion of a length of said at least one fluid fuel stream with a substoichiometric amount of at least one primary oxidant stream injected at a velocity less than 200 feet per and partially combusting said fluid fuel with the primary oxidant to form partially combusted products;

(c) injecting at least one secondary oxidant stream angled away from said fluid fuel stream and primary oxidant stream, or from a point spaced from where said fluid fuel and primary oxidant streams are injected, or from an opposite point from where said fluid fuel and primary oxidant streams are injected, wherein said secondary oxidant stream has a spacing distance, an ejection angle and a velocity that establishes a gas circulation pattern that promotes entrainment of ambient gas to dilute said at least one secondary stream, and wherein said at least one secondary stream injected is such that the volume ratio of said secondary oxidant to said primary oxidant is greater than 2.4:1 but less than 9:1;

(d) diluting said secondary oxidant stream with a large volume of ambient gas containing an oxygen concentration of about 0.5 to about 15 percent by volume to form a diluted stream; and (e) mixing said diluted stream to said partially combusted product and thereafter combusting said partially combusted product with the oxygen in said diluted stream.

2. The process according to claim 1, wherein the velocity of said secondary oxidant stream is greater than 200 feet per second.

3. A process for combusting liquid fuel with reduced nitrogen oxides generation, said process comprising:

(a) providing in a combustion zone at least one liquid fuel stream ejected from a nozzle in the form of a spreading spray having an outer periphery angle of less than 15°, measured from the axis of said at least one liquid fuel stream, said nozzle having an opening at a tip that is recessed from an internal opening of at least one refractory port defined by at least one wall surrounding said combustion zone;

(b) injecting a substoichiometric amount of a primary oxidant stream at a velocity of less than about 200 feet per second in the form of an annular stream to surround or envelop at least a portion of a length of said at least one liquid fuel stream;

(c) entraining at least a portion of said primary oxidant stream within said liquid fuel stream and partially combusting said liquid fuel with the entrained oxidant to form partially combusted products;

(d) injecting at least one secondary oxidant stream to establish an ambient gas circulation pattern wherein a large volume of ambient gas is entrained within said at least one secondary oxidant stream to form a diluted stream having an oxygen concentration of about 1 to about 30 percent by volume before being mixed with said partially combusted products and wherein the velocity of said at least one secondary oxidant stream ejected is such that said volume ratio of the secondary oxidant to the primary oxidant is greater than 2.4:1; and (e) mixing said diluted stream with said partially combusted products and thereafter combusting said partially combusted products with the oxidant in said diluted stream.

4. The process according to claim 3, wherein the velocity of said at least one secondary oxidant stream injected is such that said volume ratio of the secondary oxidant to the primary oxidant is greater than 4:1 and such that said at least one secondary oxidant stream flows at a velocity greater than the velocity of said liquid fuel stream.

5. The process according to claim 3, wherein said at least one liquid fuel stream of step (a) is formed by injecting at least one liquid fuel stream in an axial direction through at least one nozzle having an opening and injecting atomizing fluid through an annular passageway having an annular opening formed between said at least one nozzle and an enclosure surrounding at least a portion of a length of said nozzle, said atomizing fluid being injected at a velocity of about 0.5 to about 1.2 Mach at a converging angle of about 12° to about 18°, measured from the axis of said liquid fuel stream, from said annular opening which is located upstream of or at the same plane as the opening of said nozzle.

6. The process according to claim 5, wherein the tip of said at least one nozzle is recessed from an internal opening of at least one refractory port defined by at least one wall surrounding said combustion zone by a distance equal to at least the diameter of said internal opening.

7. The process according to claim 5, wherein the volume ratio of said atomizing fluid to said liquid fuel is in the range of about 0.4 to about 0.7.

8. The process according to claim 5, wherein said secondary oxidant stream is injected from a lance spaced or angled away from said at least one nozzle or located at a wall adjacent or opposite to where said at least one nozzle is located.

9. The process according to claim 6, further comprising injecting an additional fuel stream selected from the group consisting of a gaseous fuel stream, a gaseous stream containing solid fuel particles and mixtures thereof from a second annular opening formed between said enclosure and a second enclosure surrounding at least a portion of a length of said enclosure.

* * * * *